United States Patent
Kim

(10) Patent No.: US 9,766,416 B1
(45) Date of Patent: Sep. 19, 2017

(54) OPTICAL MODULE AND METHOD OF MANUFACTURING THE SAME

(71) Applicant: Yottahn, Inc., Palo Alto, CA (US)

(72) Inventor: Hyogyeom Kim, Osan (KR)

(73) Assignee: Yottahn, Inc., Palo Alto, CA (US)

( * ) Notice: Subject to any disclaimer, the term of this patent is extended or adjusted under 35 U.S.C. 154(b) by 0 days.

(21) Appl. No.: 15/263,172

(22) Filed: Sep. 12, 2016

(51) Int. Cl.
*G02B 6/42* (2006.01)
*G02B 6/32* (2006.01)
*G02B 6/34* (2006.01)

(52) U.S. Cl.
CPC ............. *G02B 6/4214* (2013.01); *G02B 6/32* (2013.01); *G02B 6/34* (2013.01); *G02B 6/4206* (2013.01); *G02B 6/4224* (2013.01); *G02B 6/4239* (2013.01); *G02B 6/4243* (2013.01); *G02B 6/4244* (2013.01)

(58) Field of Classification Search
None
See application file for complete search history.

(56) References Cited

U.S. PATENT DOCUMENTS

| 9,423,569 | B2 | 8/2016 | Son et al. | |
|---|---|---|---|---|
| 2008/0095506 | A1* | 4/2008 | McColloch | G02B 6/4214 385/89 |
| 2011/0123151 | A1* | 5/2011 | Zbinden | G02B 6/4214 385/33 |
| 2013/0129281 | A1* | 5/2013 | Son | G02B 6/4214 385/33 |
| 2013/0156385 | A1* | 6/2013 | Ishigami | G02B 6/4268 385/92 |
| 2013/0259431 | A1* | 10/2013 | Charbonneau-Lefort | G02B 6/4214 385/89 |
| 2013/0266262 | A1* | 10/2013 | Nishimura | G02B 6/32 385/35 |
| 2013/0279860 | A1* | 10/2013 | Hung | G02B 6/43 385/89 |
| 2014/0063740 | A1* | 3/2014 | Sunaga | H01L 23/473 361/699 |
| 2014/0270641 | A1* | 9/2014 | Sheu | G02B 6/4206 385/33 |
| 2014/0314424 | A1* | 10/2014 | Sheu | H04B 10/40 398/139 |
| 2015/0192745 | A1* | 7/2015 | Yamazaki | G02B 6/4292 385/83 |

FOREIGN PATENT DOCUMENTS

| KR | 10-1480025 B1 | 1/2015 |
|---|---|---|
| KR | 10-1502318 31 | 3/2015 |

* cited by examiner

*Primary Examiner* — Mike Stahl
(74) *Attorney, Agent, or Firm* — McGuireWoods LLP

(57) ABSTRACT

There is provided an optical module, which includes a substrate; one or more optical devices disposed on the substrate; an integrated circuit (IC) device disposed on the substrate for driving the one or more optical devices; one or more optical fibers in optical communications with the one or more optical devices, respectively; an optical bench that attaches to the substrate and concentrates a direction of the light transmitted between the one or more optical devices and the one or more optical fibers; and a cover that attaches to the optical bench with the one or more optical fibers fixed therebetween. The optical bench changes a direction of the concentrated light.

20 Claims, 12 Drawing Sheets

OPTICAL MODULE AND METHOD OF MANUFACTURING THE SAME

BACKGROUND

1. Field of the Disclosure

The present disclosure relates to an optical module and a method of manufacturing the same.

2. Background of the Disclosure

As various multimedia services have emerged recently, the necessity for exchanging a large amount of information has increased and the amount of data to be transmitted via networks has also increased. Since the introduction of high definition (HD) and ultra high definition (UHD) media broadcasting and streaming services, the conventional copper wire-based data transmission has reached its capacity limit, and optical fiber-based data transmission has become a new mainstream. The data transmission via the optical fibers is not susceptible to electromagnetic interference. With the broadband data transmission capability, optical fibers are widely used for large-capacity transmission of digital media including, for example, HD and UHD digital video broadcasting and streaming services.

An optical module operates a data receiving device that converts optical signals received via optical fibers into electrical signals. The same optical module may operate as a data transmitting device that converts electrical signals into optical signals and transmits the optical signals via optical fibers. An optical module requires alignments to adjust arrangements of the components to minimize a loss of optical signals during the transmitting or receiving operations.

Meanwhile, due to its cutting characteristic, an optical fiber is very often not cut properly, and its cut surface may be slightly tilted or inclined, which causes an optical distortion phenomenon or an optical signal loss. Therefore, there is a need for an optical module that minimizes or eliminates the optical distortion phenomenon and the optical signal loss.

SUMMARY OF THE DISCLOSURE

According to an aspect of the present disclosure, an optical module includes a substrate; one or more optical devices disposed on the substrate; an integrated circuit (IC) device disposed on the substrate for driving the one or more optical devices; one or more optical fibers in optical communications with the one or more optical devices, respectively; an optical bench that attaches to the substrate and concentrates a direction of the light transmitted between the one or more optical devices and the one or more optical fibers, wherein the optical bench changes a direction of the concentrated light; and a cover that attaches to the optical bench with the one or more optical fibers fixed therebetween.

The optical bench may include a first body; a seating groove that is formed on a top surface of the first body to receive the one or more optical fibers; and an optical unit that adjoins an end of the seating groove and faces ends of the one or more optical fibers. The optical unit may concentrate and change the direction of the light transmitted between the one or more optical devices and the one or more optical fibers.

The optical unit may adjoin an end of the seating groove.

The cover may include a second body that is shaped to engage the first body of the optical bench, and a hold part that is formed at a bottom surface of the second body and shaped corresponding to the seating groove to hold the one or more optical fibers therebetween.

The first body and a second body may be block-shaped.

A space between the seating groove and the hold part may be tapered to become gradually widened from one end thereof adjoining the optical unit toward the other end portion.

The cover may further include an injection port extending through the second body to the hold part.

The optical module may further include one or more reference marks formed on the substrate.

The optical unit may include one or more first lenses facing the one or more optical devices, and a reflector unit that is disposed on the one or more first lenses to deflect the light transmitted between the one or more optical devices and the one or more optical fibers.

The reflector unit may include a prism, and the one or more first lenses may be disposed on a bottom of the prism The reflector unit may include a reflectance surface that has an inclination of about 45° and adjoins the seating groove.

The cover may further include a lens assembly that includes one or more lenses provided corresponding to the one or more optical fibers, respectively. The lens assembly may concentrate the light transmitted between the optical unit and the one or more optical fibers.

The lens assembly may include a lens bar that protrudes from the bottom surface of the second body of the cover and is perpendicular to a lengthwise direction of the one or more optical fibers, and one or more second lenses disposed at a first surface of the lens bar facing the reflector unit.

The lens assembly may further include one or more third lenses disposed at a second surface of the lens bar facing the one or more optical fibers.

The one or more second lenses may include a convex lens.

The one or more second lens may include an aspheric convex lens, and the one or more third lenses may include an aspheric concave lens.

The one or more second lenses include an aspheric concave lens, and the one or more third lenses may include an aspheric convex lens.

The cover block may further include a step jaw that protrudes from the bottom surface of the second body of the cover between the lens assembly and the injection port. The step jaw may limit movements of the ends of the one or more optical fibers.

According to another aspect of the present disclosure, a method of manufacturing an optical module includes printing wiring on a top surface of a substrate. One or more reference marks are printed on the top surface of the substrate. One or more optical devices and an integrated circuit (IC) device are mounted on the wiring. An optical bench are aligned and attached onto the substrate by referring to the one or more reference marks. A cover is attached to the optical bench. One or more optical fibers are inserted into a space between the optical bench and the cover. Vertical and horizontal directions of the one or more optical fibers are adjusted while holding the one or more optical fibers from outside the optical bench to find positions for the one or more optical fibers that maximizes an optical efficiency thereof. The one or more optical fibers are fixed to the position that maximizes there optical efficiency.

The fixing may include injecting an adhesive through an injection port formed at the cover, and hardening the adhesive.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF EXEMPLARY EMBODIMENTS

Figure 1:
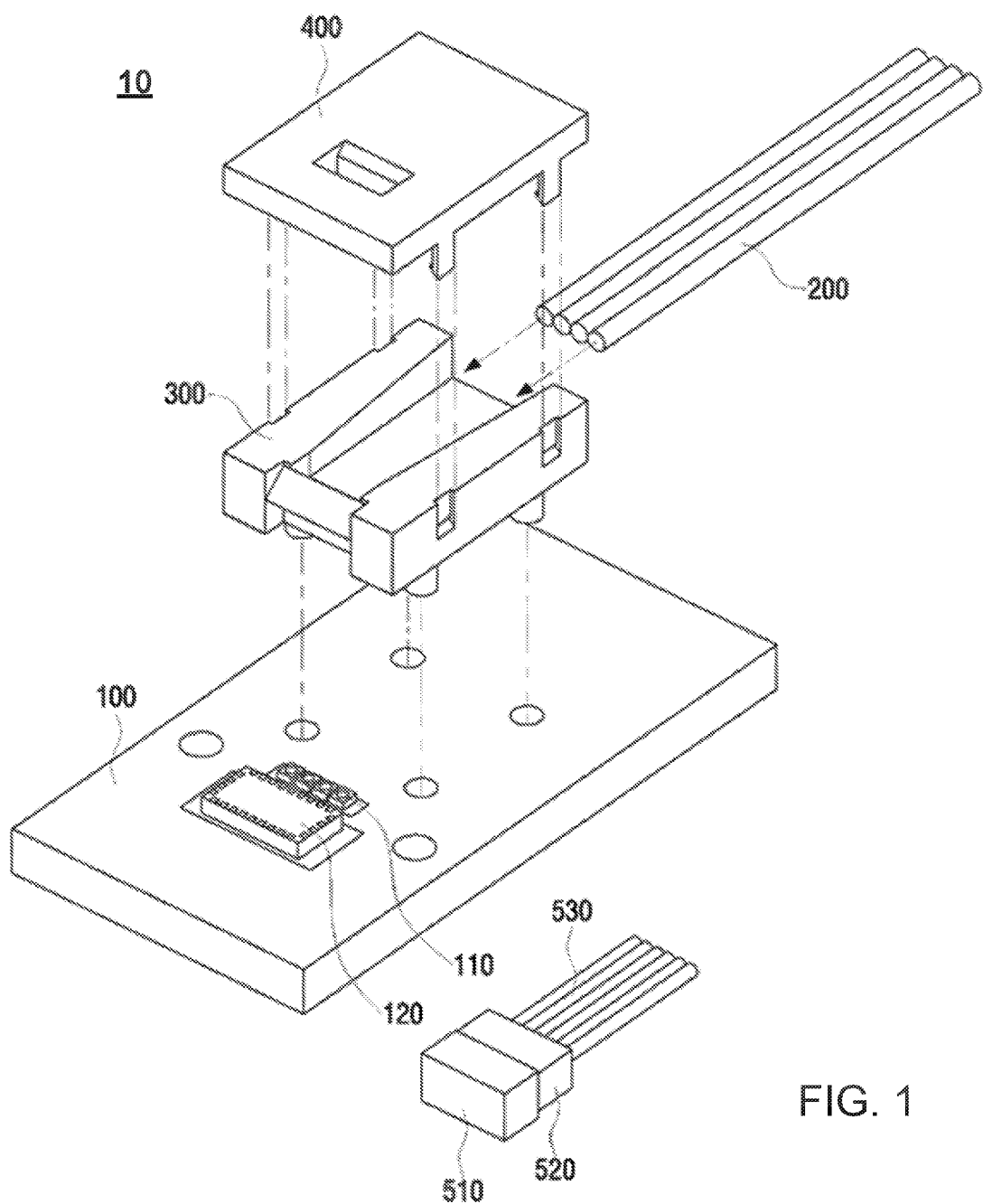
FIG. 1 is an exploded perspective view of an example of an optical module according to the principles of the present disclosure.

The disclosure and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

FIG. 1 is an exploded perspective view of an example of an optical module, which is constructed according to the principles of the present disclosure. As illustrated in FIG. 1, the optical module may include, for example, a substrate 100, one or more optical devices 110, one or more optical fibers 200, an optical bench 300, a cover 400, and the like.

The optical devices 110 may be disposed on and/or in the substrate 100. The one or more optical fibers 200 may be in optical communication with the one or more optical devices 110, respectively. The one or more optical fibers 200 may be fixed to the optical bench 300. The optical bench 300 may accommodate optical coupling between the one or more optical devices 110 and the one or more optical fibers 200. The cover 400 may attach to and cover the optical bench 300.

The optical fibers 200 may be, for example, glass optical fibers, polymer optical fibers, or the like. Polymer optical fibers may be more easily connectable and usable, which may contribute to reducing the installation cost. Thus, polymer optical fiber may be used in a short range network that is, for example, equal to or less than about 100 m. Polymer optical fibers are more flexible compared to glass optical fibers and thus may sustain a tighter bend radius. The tighter bend radius may facilitate installation of optical fiber wiring in, for example, residential houses, commercial buildings, and the like, where wiring may need to be bent frequently for installation. The optical fibers 200 may be a hybrid cable, which bundles, for example, optical fibers and a coaxial cable, or the like. Alternatively, the hybrid cable may be a bundle of optical fibers and a power line, a bundle of optical fibers and local area network (LAN) lines (e.g., unscreened twisted pairs/screened twisted pairs (UTP/FTP)), or the like.

Figure 2:
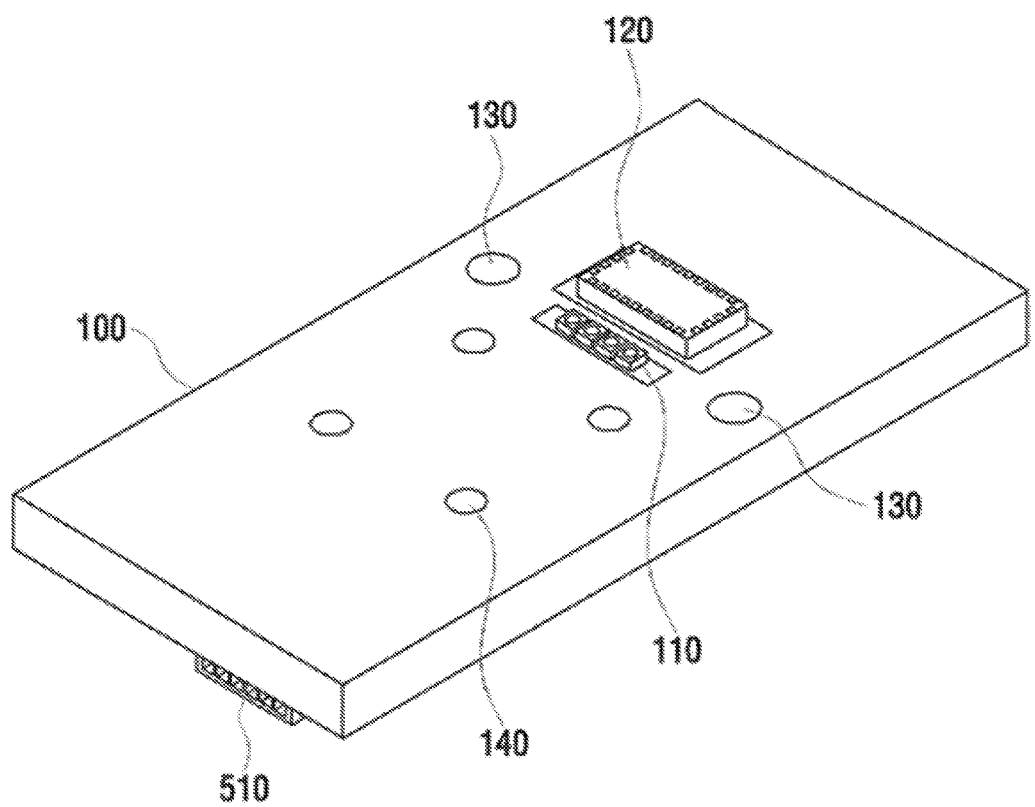
FIG. 2 is a perspective view of a substrate of the optical module of FIG. 1.

FIG. 2 is a perspective view of the substrate 100 of FIG. 1. As illustrated in FIG. 2, the substrate 100 may include, for example, on a top surface thereof, the optical devices 110, an integrated circuit (IC) device 120 for driving the optical devices 110, one or more reference marks 130 for aligning components to be attached thereto, and the like. The substrate 100 may be a printed circuit board (PCB) or the like, for example. Wiring for electrically connecting the optical devices 110 to the IC device 120 and the reference marks 130 may be printed on the substrate 100 at production. Leg insertion holes 140, into which legs 350 (shown in FIG. 3) of the optical bench 300 may be inserted, may be formed in the substrate 100. The optical devices 110 may include, for example, light-emitting devices or the like, when the optical module operates as an optical transmitter. The optical devices 110 may include, for example, photodetectors or the like, when the optical module operates as an optical receiver. Laser diodes may be used as the light-emitting devices, and photodiodes may be used as the photodetectors. The number of the optical devices 110 may correspond to the number of the optical fibers 200. For example, FIG. 1 shows four optical fibers 200, which are bundled as a ribbon-slot-shaped optical fiber cable, and four optical devices 110 disposed corresponding to the four optical fibers 200, respectively. Two adjoining optical devices 110 may be spaced apart with a gap therebetween, which may correspond to a distance between the cores of two adjoining optical fibers 200. The IC device 120 may be, for example, a circuit for driving the optical devices 110, a circuit for processing signals input from the optical fibers 200, or the like. When the optical module is an optical transmitter, the IC device 120 may include, for example, a vertical-cavity surface-emitting laser (VCSEL) driving IC or the like, for driving a light emitting device. When the optical module is an optical receiver, the IC device 120 may include, for example, a photo diode trans-impedance amplifier (TIA), or the like.

A receptacle 510, to which a copper cable 530 may be coupled, may be installed on a bottom surface of the substrate 100. When the optical fibers 200 and a coaxial cable are bundled together as a hybrid cable, the copper cable 530 may be split off from the optical fibers 200 and connected to a connector 520. The connector 520 may be inserted into the receptacle 510 so that electrical signals may be transmitted to and received by the substrate (or PCB) 100 through the copper cable 530.

The reference marks 130 may serve as reference points for accurately positioning the optical bench 300 on the substrate 100 such that the optical devices 110 located on the substrate 100 and the optical fibers 200 attached to the optical bench 300 may be more accurately aligned together. Accurate positioning of the optical devices 110 and an optical unit 320 (shown in FIG. 3) of the optical bench 300 may contribute to more efficient light transmission between the optical devices 110 and the optical fibers 200. Thus, the reference marks 130 may be used to accurately position the optical bench 300 on the substrate 100. When components are being disposed on the PCB 100 using, for example, pick-and-place equipment or the like, the components may be disposed in their correct positions by referring to the reference marks 130. At least one, and preferably two or more reference marks 130 may be formed on the substrate 100. The reference marks 130 may be disposed on the same axis as that of the optical devices 110 with the optical devices 110 therebetween. The reference marks 130 on the substrate 100 may be formed simultaneously with the formation of the wiring pattern for the optical devices 110 and the IC device 120. Fiducial marks may be used as the reference marks 130, for example. The reference marks 130 may be formed with μm level precision, for example, approximately 50 μm level precision for a glass epoxy PCB and approximately 10 μm level precision accuracy for a ceramic PCB. The reference marks 130 for the optical bench 300 may be formed with submicron level precision by, for example, deposition, lithography, etching, or the like. When components are aligned on the substrate 100 using the reference marks 130, submicron level precision may be attained. An optical alignment may be achieved by, for example, coupling reference grooves formed on a substrate and legs formed on an optical bench, as described in the Korean Patent Registration No. 1502318. When the reference grooves are formed on the substrate 100, due to the drill tolerance and the processing tolerance during drilling, an error of approximately ±15 μm may occur. The reference marks 130 may reduce or eliminate misalignment due to such errors. Also, by carrying out both of the alignment using the leg insertion holes 140 on the substrate 100 and the legs 350 on the optical bench 300 and the alignment using the reference marks 130, the optical module may be produced and constructed with more precision, which may contribute to improvement in performance and durability.

Figure 3:
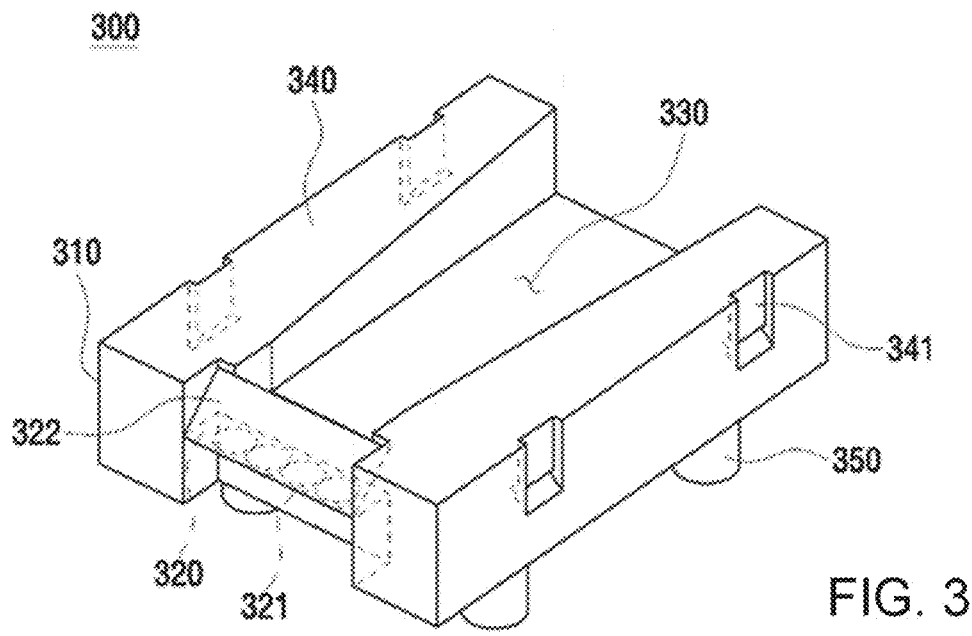
FIG. 3 is a see-through perspective view of an optical bench of the optical module of FIG. 1.

FIG. 3 is a see-through perspective view of the optical bench 300. As illustrated in FIG. 3, the optical bench 300 may include, for example, a bench body 310, the optical unit 320, a seating groove 330, sidewall parts 340, the leg 350, and/or the like. The bench body 310 may be block-shaped. The optical unit 320 may concentrate the light radiated between the optical devices 110 and the optical fibers 200. The optical fibers 200 may be seated on the seating groove 330. The sidewall parts 340 may be formed at opposing (for example, right and left) sides of the seating groove 330. As described above, the legs 350 may be used to attach the optical bench 300 to the substrate 100.

The seating groove 330 may be formed in, for example, a region central with respect to a lengthwise direction of the body 310, and the optical fibers 200 may be seated therein. The seating groove 330 may have, for example, a tapered shape, which may gradually widen from one end adjoining the optical unit 320 toward the other end into which the optical fibers 200 may be inserted. The seating groove 330 may gradually deepen from the one end adjoining the optical unit 320 toward the other end portion. The seating groove 330 may be constructed such that the depth and width are formed to have an inclination of, for example, approximately 5°. At the one end adjoining the optical unit 320, the size (e.g., width, depth, etc.) of the seating groove 330 may correspond to the diameter of each of the optical fibers 200 to be inserted.

The sidewall parts 340 that may form wall surfaces of the seating groove 330 may be formed at opposing (for example, right and left) sides of the seating groove 330. Fastening grooves 341, which may engage the cover block 400, may be formed on outer surfaces of the sidewall parts 340. The optical unit 320 may be formed at a position where ends of the optical fibers 200 are placed. The optical unit 320 may include one or more first lenses 321, which may be positioned to face the one or more optical devices 110.

The optical unit 320 may include a reflector unit 322, which may be placed on or proximate to the first lenses 321 to deflect the optical path of the light radiated from the optical devices 110 or the light from the optical fiber 200, by, for example, about 90°. A space may be formed between the optical devices 110 and the optical unit 320 so that the first lenses 321 may be spaced apart from the optical devices 110 by a distance that may ensure the highest light-receiving efficiency. A bottom of the seating groove 330 may be set to have a certain height or depth to ensure the separation distance between the optical devices 110 and the first lenses 321. Convex lenses may be used as the first lenses 321. A prism, a reflector, or a high reflection coating on a reflectance surface may be used in the reflector unit 322. The prism, the reflector, or the reflectance surface may have an inclination of, for example, about 45°.

The legs 350 may be used to attach the optical bench 300 onto the substrate 100. The legs 350 may be formed in the form of, for example, pillars, rods, pins, or the like, on the bottom surface of the optical bench 300 at positions corresponding to the leg insertion holes 140. By inserting the legs 350 into the leg insertion holes 140, the optical bench 300 may be fixed on the substrate 100 at a precise position suitable for optimal optical coupling.

Figure 4:
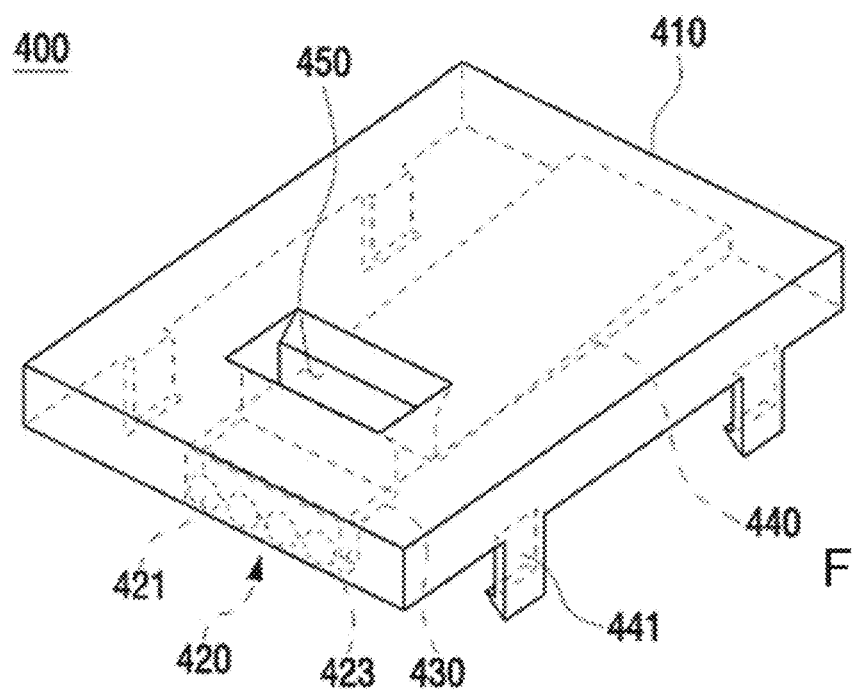
FIG. 4 is a see-through perspective view of a cover of the optical module of FIG. 1.
Figure 5:
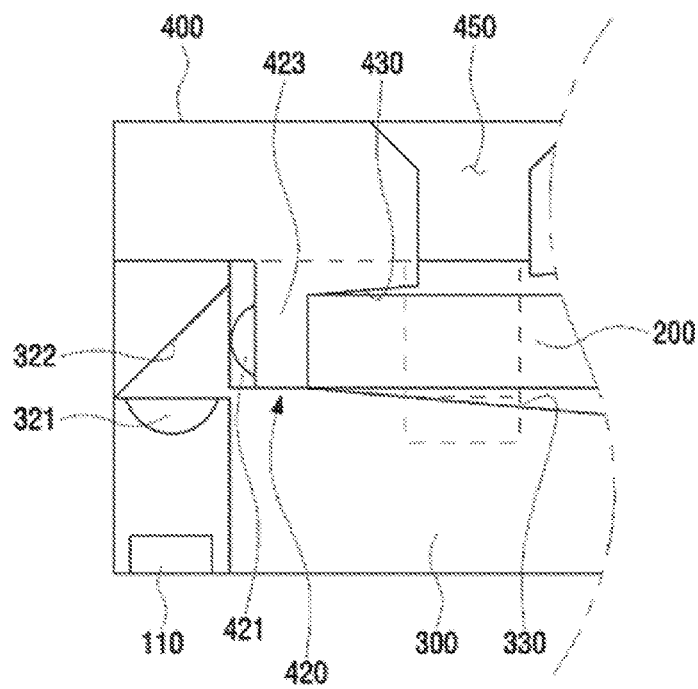
FIG. 5 is a cross-sectional view of the optical bench of FIG. 3 and the cover of FIG. 4 being attached to each other.

FIG. 4 is a see-through perspective view of the cover 400; and, FIG. 5 is a cross-sectional view illustrating the optical bench 300 and the cover 400 attached to each other.

As illustrated in FIG. 4, the cover 400 may include, for example, a cover body 410, a lens assembly 420, a hold part (or retainer) 430, side bottom parts 440, an injection port 450, and/or the like. The cover body 410 may be block-shaped. The lens assembly 420 may concentrate the received light. An adhesive may be injected into the injection port 450. The hold part 430 may hold the optical fibers 200. The side bottom parts 440 may be formed at opposing (for example, right and left) sides of the hold part 430. The hold part 430 may be formed in a shape corresponding to that of the seating groove 330. One end portion of the hold part 430 may be inserted into and coupled to the seating groove 330. That is, to correspond to the shape of the seating groove 330, the hold part 430 may be tapered and gradually widen from one end adjoining the lens assembly 420 toward the other end into which the optical fibers 200 are inserted. A bottom surface of the hold part 430 may be the lowest at the one end adjoining the lens assembly 420 and may become gradually higher toward the other end.

The height at the one end of the hold part 430 adjoining the lens assembly 420 may be set in such a way that the one end may hold the optical fibers 200 by being inserted into the seating groove 330 when the optical bench 300 and the cover 400 are coupled to each other. The injection port 450 may be formed through the top surface of the body 410. The injection port 450 may be formed to have the same width as that of the hold part 430 and may be formed to be spaced a set distance apart from the ends of the optical fibers 200 inserted into the seating groove 330.

An adhesive, such as, for example, epoxy or the like, may be injected through the injection port 450 so that the optical fibers 200 inserted into the seating groove 330 may be fixed and not move. The injected adhesive may move (for example, flow) between and around the optical fibers 200 and between and around the optical fibers 200 and the hold part 430. An inlet of the injection port 450 may be tapered so that the inlet gradually narrows downward. Fastening ports 441 that extend from ends of sides of the body 410 may be formed at positions corresponding to the fastening grooves 341 of the optical bench 300, which may reinforce the coupling between the cover 400 and the optical bench 300.

The lens assembly 420 may be disposed between the optical unit 320 and ends of the optical fibers 200. The lens assembly 420 may include a lens bar 423 having a vertical surface in contact with cut (or end) surfaces of the optical fibers 200, and one or more second lens 421 disposed at the other surface of the lens bar 423 and facing the reflector unit 422. The lens assembly 420 may be disposed between the optical unit 320 and the ends of the optical fibers 200. The second lenses 421 may be disposed for the optical fibers 200, respectively. The second lenses 421 may be aspheric lenses, which may reduce optical aberration. The thickness of the lens bar 423 may be set to form an optical path that minimizes an optical loss. The light delivered to portions between the optical fibers 200 and the optical devices 110 may be concentrated twice using the lens assembly 420 and the optical unit 320, which may improve the efficiency of delivering light.

Figure 6:
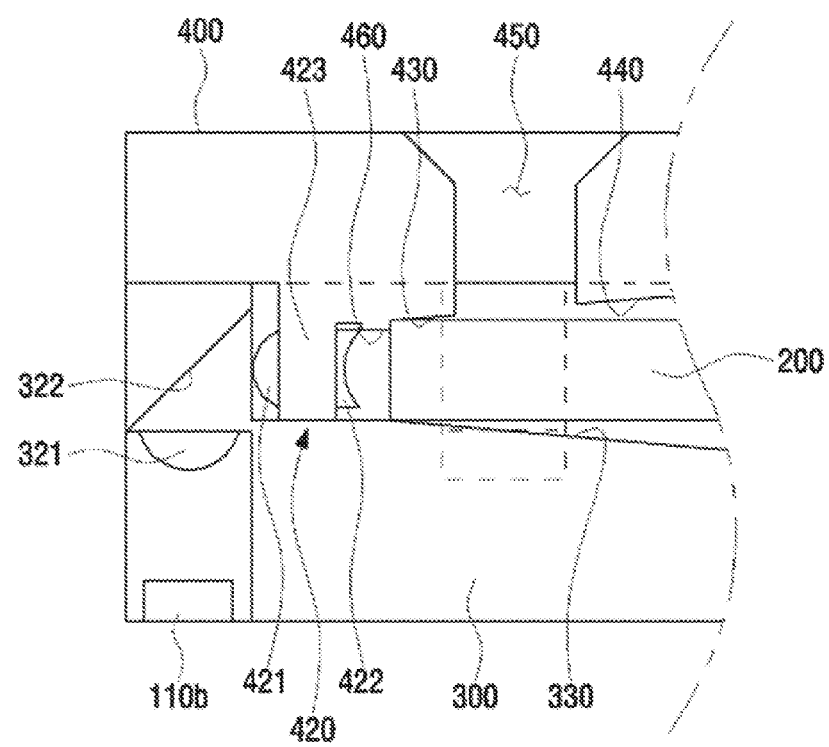
FIG. 6 is a cross-sectional view illustrating another example of an optical bench and a cover attached to each other, according to the principles of the present disclosure.
Figure 7:
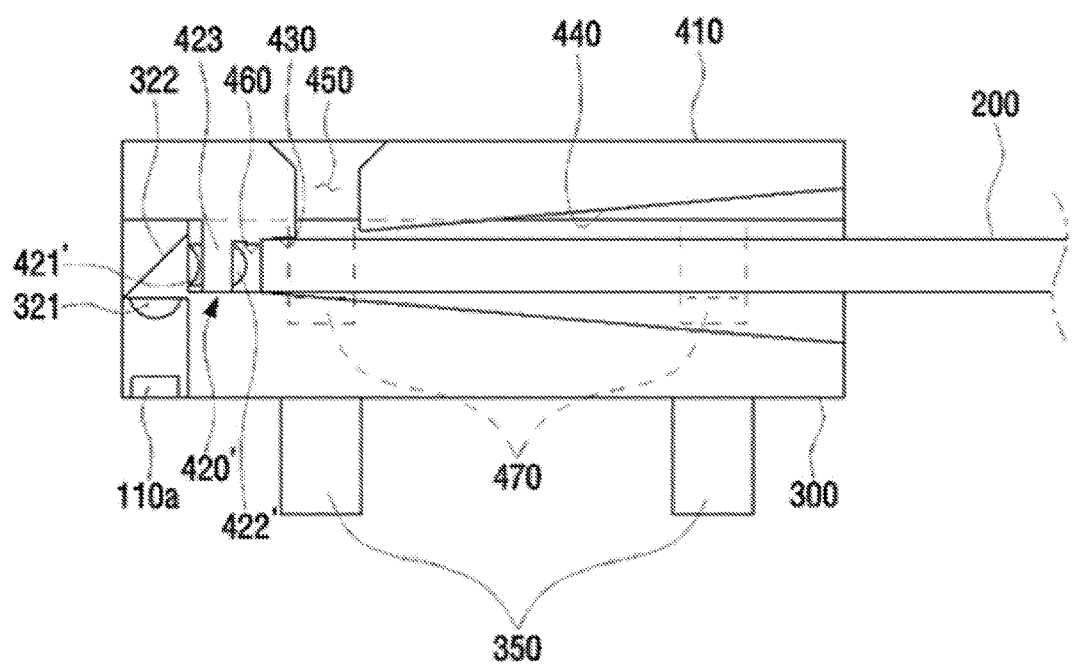
FIG. 7 is another cross-sectional view illustrating the optical bench and the cover of FIG. 6 attached to each other.

FIGS. 6 and 7 are cross-sectional views of another example of an optical module constructed according to the principles of the present disclosure. FIG. 6 illustrates the optical bench 300 and the cover 400 coupled to each other when the optical module is an optical receiver. FIG. 7 illustrates the optical bench 300 and the cover block 400 coupled to each other when the optical module is an optical transmitter. Descriptions of the configurations that are the same as the optical module illustrated in FIGS. 3 to 5 will be omitted.

As illustrated in FIGS. 6 and 7, the cover 400 may include the cover body 410, the lens assembly 420 that concentrates the light between the optical fibers 200 and optical unit 320, the injection port 450 through which an adhesive is injected, the hold part 430 that holds the optical fibers 200, the side bottom parts 440 formed at, for example, right and left sides of the hold part 430, and a step jaw (or stop) 460 that extends from one end portion of the hold part 430 to limit positions of the cut (or end) surface of the optical fibers 200.

The hold part 430 may be formed in a shape corresponding to that of the seating groove 330 so that one end of the hold part 430 may be inserted into and coupled to the seating groove 330. That is, to correspond to the shape of the seating groove 330, the hold part 430 may be formed in a tapered shape that gradually widens from the one end adjoining the step jaw 460 toward the other end into which the optical fibers 200 are inserted. The bottom surface 440 of the hold part 430 may be the lowest at the one end adjoining the step jaw 460 and become gradually higher toward the other end. The height at the one end of the hold part 430 adjoining the step jaw 460 is set to hold down the optical fibers 200 when the optical bench 300 and the cover 400 are coupled to each other.

The injection port 450 may be formed through the top surface of the cover body 410. The injection port 450 may be formed to have the same width as that of the hold part 430 and may be spaced apart from the step jaw 460. An adhesive, such as, for example, epoxy or the like, may be injected through the injection port 450 so that the optical fibers 200 inserted into the seating groove 330 may be fixed and not move. The injected adhesive may flow between and around the optical fibers 200 and between and around the optical fibers 200 and the grooves of the hold part 430 due to the capillary action. An inlet of the injection port 450 may be tapered to become gradually narrower downward.

The step jaw 460 may be formed at a position on an optical path where the cut (or end) surfaces of the optical fibers 200 may be disposed. The step jaw 460 may be formed as, for example, a protrusion from a bottom surface of the cover block 400. Movement of the ends of the optical fibers 200 may be limited by the step jaw 460. The height of the step jaw 460 may be set to correspond to a thickness of a coating layer and a cladding layer of the optical fibers 200 to reduce or eliminate a loss of light incident on the ends of the optical fibers 200. The step jaw 460 may be contoured to match the outline of the optical fibers 200, so as to prove a seal and prevent adhesive from flowing past the step jaw 460.

A configuration of the lenses of the lens assembly 420 may be different between when the optical module is a receiver and when the optical module is a transmitter. In FIG. 6, when the optical module is an optical receiver, a photodetector, such as, for example, photodiode or the like, may be used as the optical device 110b. A convex lens may be used as the second lens 421 of the lens assembly 420. A concave lens may be used as a third lens 422. The lens assembly 420 may include, for example, the second lens 421 facing the reflector unit 322, a third lens 422 facing the optical fibers 200, and the lens bar 423 having the second lens 421 positioned at one surface thereof and the third lens 422 positioned at the other surface. The lens bar 423 may be formed perpendicular to the cut (or end) surfaces of the optical fibers 200. The concave lens may be used for the third lens 422 to receive light dispersed from the light fibers. The received light may be evenly dispersed. The convex lens may be used for the second lens 421 to concentrate light to the reflector unit 322.

In FIG. 7, when the optical module is an optical transmitter, a light-emitting device, such as, for example, laser LED or the like, may be used as the optical device 110a. The lens assembly 420' may include a second lens 421' facing the reflector unit 322, a third lens 422' facing the optical fibers 200, and the lens bar 423 having the second lens 421' formed at one surface thereof and the third lens 422' formed at the other surface. The lens bar 423 may vertically formed perpendicular to the cut surfaces of the optical fibers 200. A concave lens may be used for the second lens 421' to receive the dispersed light reflected by the reflector unit 322. The received light may be evenly dispersed. A convex lens may be used for the third lens 422' to concentrate the light to the cut surfaces of the optical fibers 200. The thickness of the lens bar 423 may be set to form an optical path with a minimized optical loss.

Hereinafter, an optical path in the optical module will be described with reference to FIGS. 6 and 7. As illustrated in FIG. 6, when the optical module is an optical receiver, the light radiated from the optical fibers 200 may be concentrated by the second lens 421, which may be a convex lens, after the diameter of the light emitted from the optical fibers 200 is enlarged by the third lens 422. The light may be deflected by, for example, about 90° by the reflector unit 322 to be delivered toward the first lens 321, which may be a convex lens. The first lens 321 may concentrate and deliver the delivered light to the optical device 110*b*, which may be an optical detector. The light received from the optical fibers 200 may be concentrated by the lens assembly 420 and may be further concentrated by the first lens 321 so that the light incident on the optical device 110*b* may be concentrated. If a convex lens is used for the third lens 422 in the optical receiver, a proportion of the light scattering from the surface of the convex lens may increase. An increase in an optical distortion phenomenon, such as, optical crosstalk, return loss, and airy disk, due to an increase in the amount of light scattering from the surface of the convex lens may be confirmed through an optical simulation. In FIG. 6, the optical distortion phenomenon may be reduced when an aspheric one-sided concave lens is used for the third lens 422 in the optical receiver.

As illustrated in FIG. 7, when the optical module device is an optical transmitter, the radiated light R emitted from the optical device 110*a* may be concentrated by the first lens 321, which may be a convex lens, and may be deflected by, for example, about 90° by the reflector unit 322 and delivered to the second lens 421', which may be a concave lens. The second lens 421' may receive evenly dispersed light from the reflector unit 322, which may improve the optical efficiency. The third lens 422', which may be a convex lens, may concentrate and deliver the light to the cores of the optical fibers 200. The radiated light of the optical devices 110*a* may be concentrated by the first lens 321 and may be further concentrated by the lens assembly 420', and the angle of the light incident on the optical fibers 200 may be equal to or less than, for example, the numerical aperture (NA) of the optical fibers 200. If a convex lens is used for the second lens 421' in the optical transmitter, a proportion of the light scattering from a surface of a convex lens may increase. An increase in an optical distortion phenomenon, such as, for example, optical crosstalk, return loss, airy disk, or the like, due to an increase in the amount of light scattering from the surface of the convex lens, may be confirmed through an optical simulation. In FIG. 7, the optical distortion phenomenon may be decreased when an aspheric one-sided concave lens is used for the second lens 421' in the optical transmitter.

Figure 8:
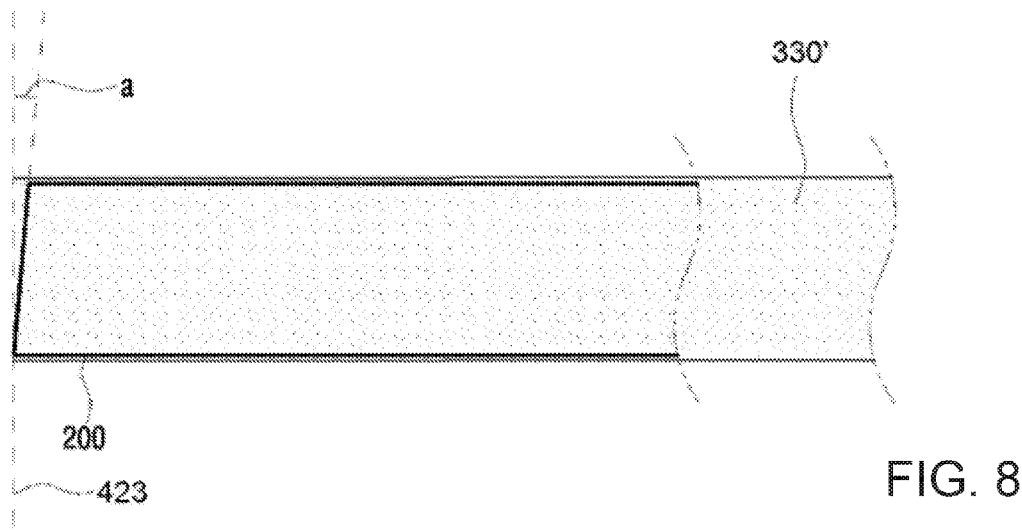
FIG. 8 is a view illustrating a cut surface of an optical fiber and an optical bench of a conventional optical device.
Figure 9:
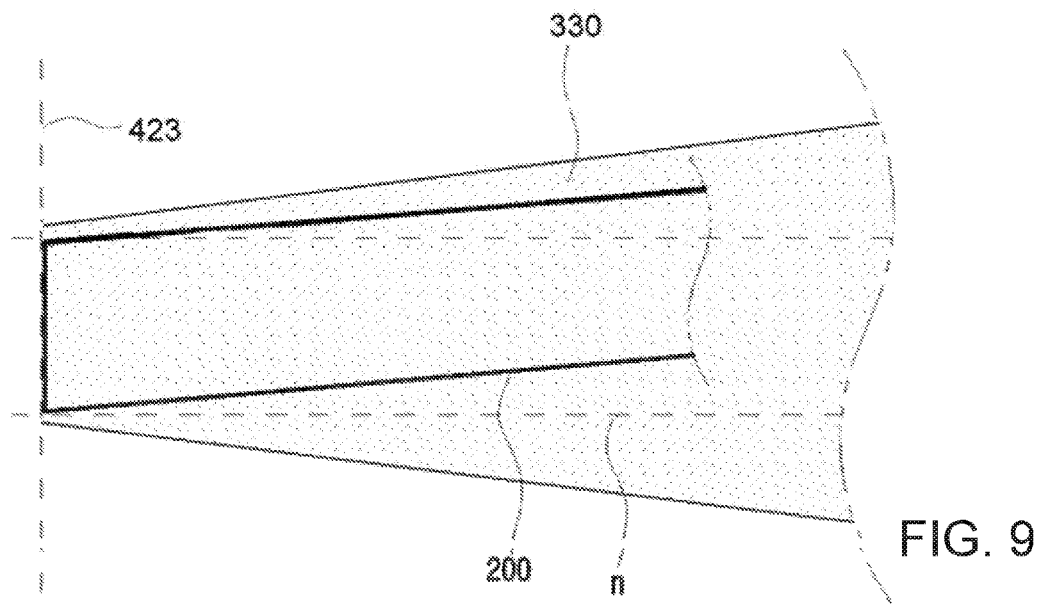
FIG. 9 is a view illustrating a cut surface of an optical fiber and an optical bench according to the principles of the present disclosure.

FIGS. 8 and 9 are views illustrating comparisons of states in which optical fibers are installed at the seating grooves 330, 330' when cut surfaces of the optical fibers 200 are inclined or tilted by 'a° ' with respect to a vertical plane perpendicular to the lengthwise direction of the optical fibers 200. Due to their cutting characteristics, the angles of the cut surfaces of the optical fibers 200 may be inclined by, for example, about 0.1° to about 5° with respect to the vertical plane in some cases. When the width and depth of the seating groove 330' of the optical bench 300 is not formed in a tapered shape, as shown in FIG. 8, the inclined cut surfaces of the optical fibers 200 may be inclined by a° with respect to the surface of the bar 423. Consequently, the cut surfaces of the optical fibers 200 may not be in full contact with the vertical surface of the lens bar 423. Similarly, when the cut surfaces of the optical fibers 200 are not disposed horizontally with respect to the lens assembly 420, or not in full contact with the vertical surface of the lens bar 423, an optical loss may occur, and optical crosstalk, return loss, and the like may occur between adjacent optical paths. When the cut surfaces of the optical fibers 200 are not disposed horizontally with respect to the lens assembly 420 or not in full contact with the vertical surface of the lens bar 423, it may take a long time to adjust or perform passive alignment of the optical fibers 200 until the efficiency of delivering light between the optical fibers 200 and the optical devices 110 becomes satisfactory.

FIG. 9 is a view schematically illustrating the optical fibers 200 coupled to the tapered seating groove 330 according to the principles of the disclosure. As illustrated in FIG. 9, since the seating groove 330 is tapered, the optical fibers 200 may be inclined so that the ends of the optical fibers 200 may be in full contact with the vertical surface of the lens bar 423 or horizontally with respect to the lens assembly 420. The optical fibers 200 may be inserted in an insertion step of the manufacturing process. Directions of the optical fibers 200 may be adjusted and held at an angle that may maximize the optical efficiency. Then, an adhesive may be injected and hardened to fix the optical fibers 200. Accordingly, once the optical fibers 200 are cut, it may not be necessary to perform a polishing process to make the cut end surfaces of the optical fibers to be perpendicular to the lengthwise direction thereof. In addition, a process of passively aligning the optical fibers 200 until the efficiency of delivering light between the optical fibers 200 and the optical devices 110 reaches a required value may be dramatically shortened. Consequently, optical modules may be manufactured with a higher yield, and therefore may become more suitable for mass production.

Figure 10:
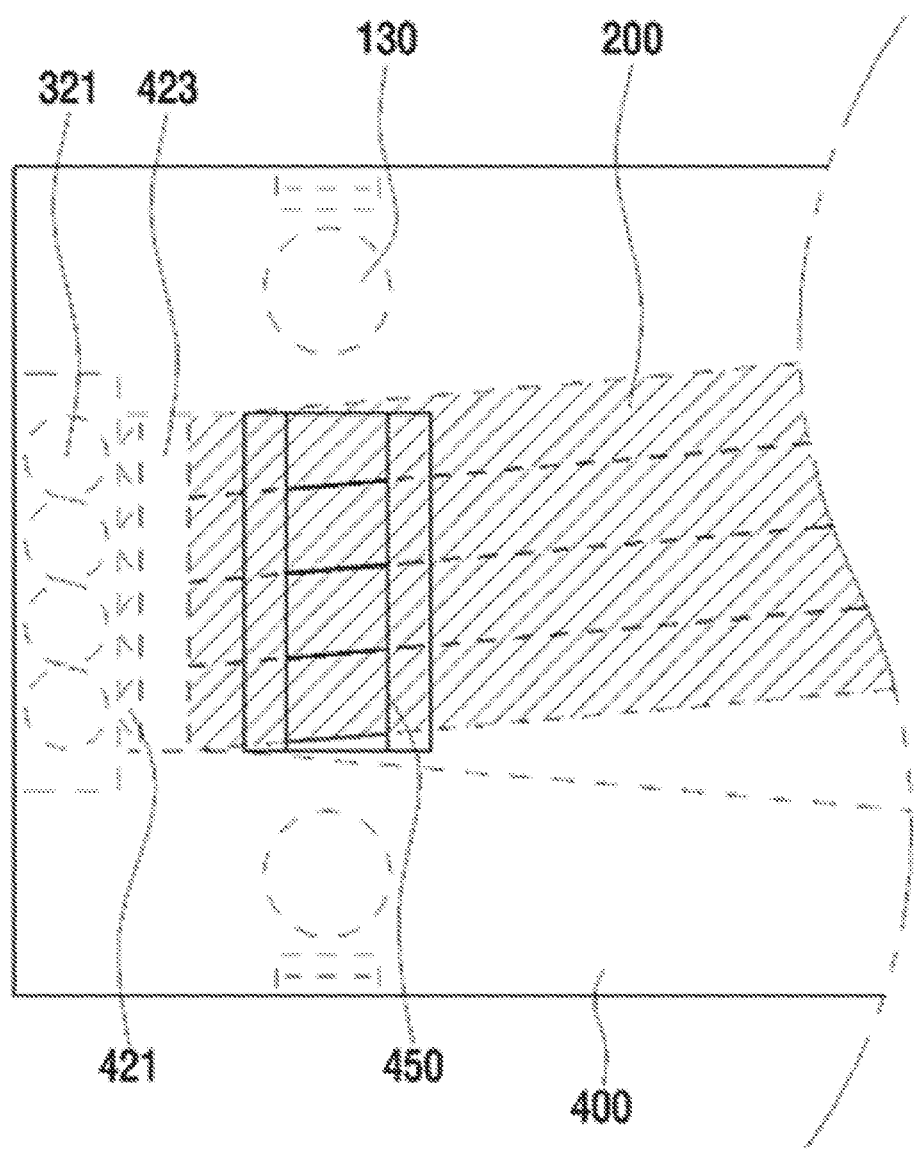
FIGS. 10 and 11 are partial top views illustrating optical fibers aligned on the optical bench and in the cover according to the principles of the present disclosure.
Figure 11:
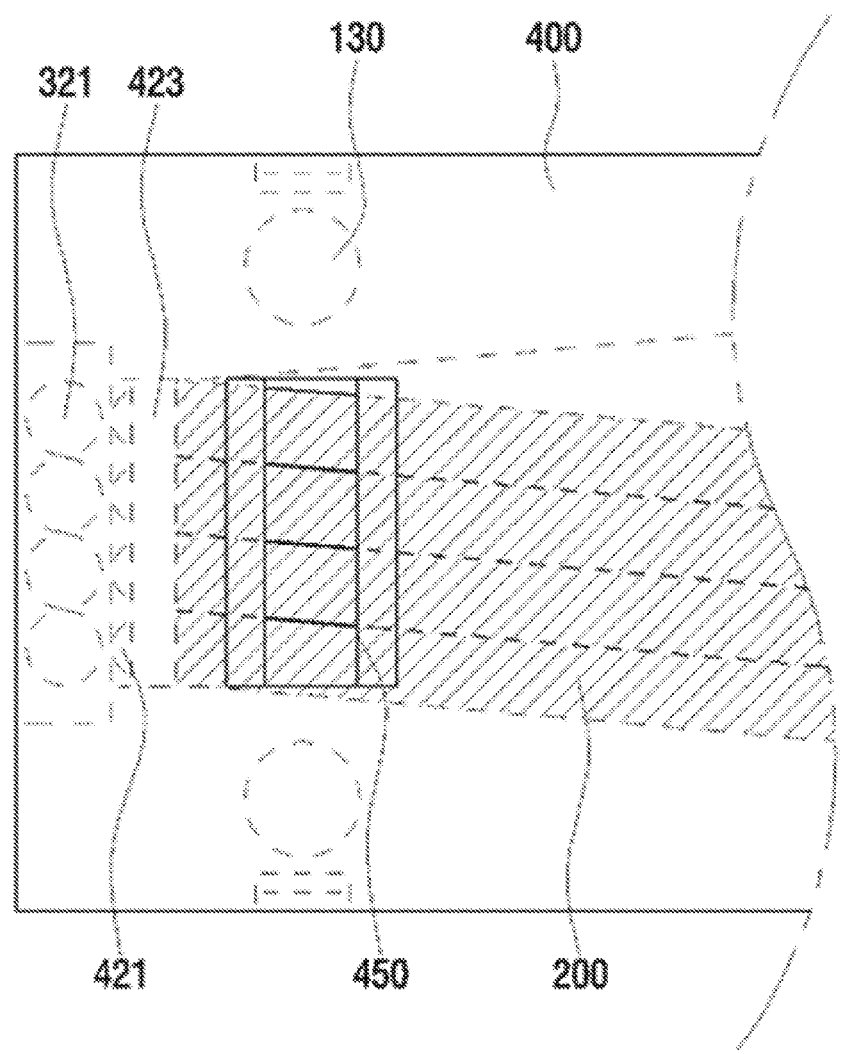
Figure 12:
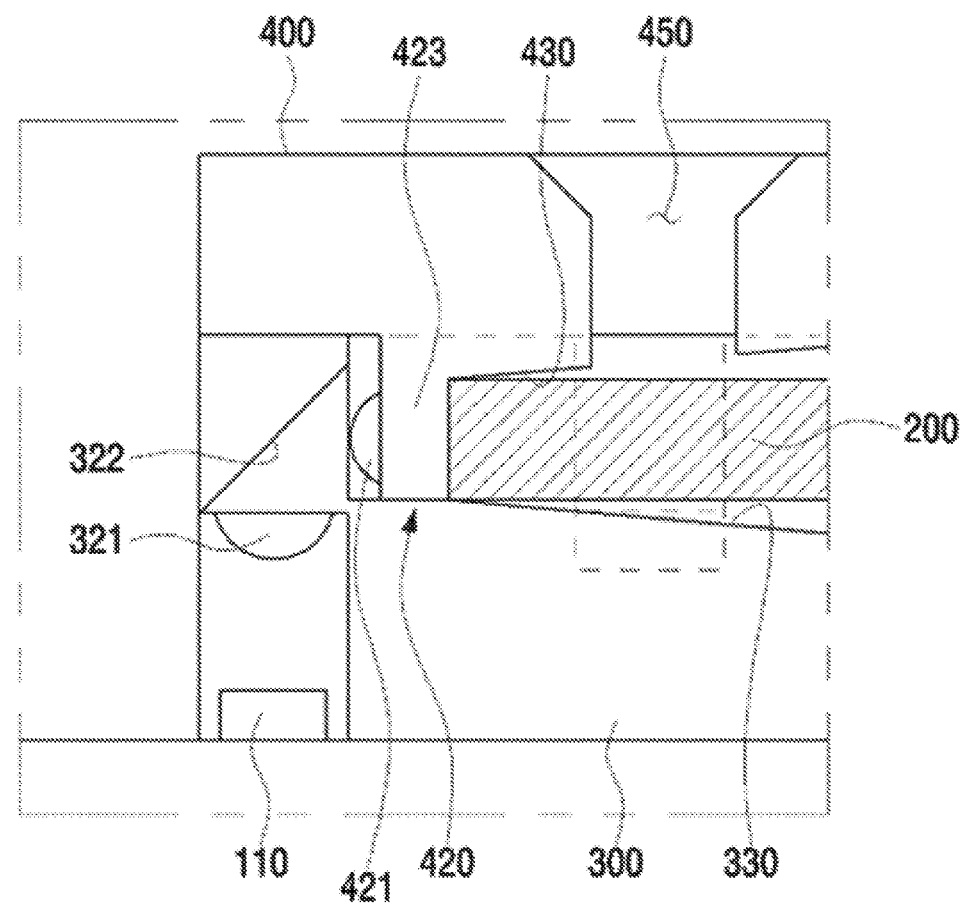
FIGS. 12 to 14 are side cross-sectional views illustrating the optical fibers aligned on the optical bench and in the cover according to the principles of the present disclosure.
Figure 13:
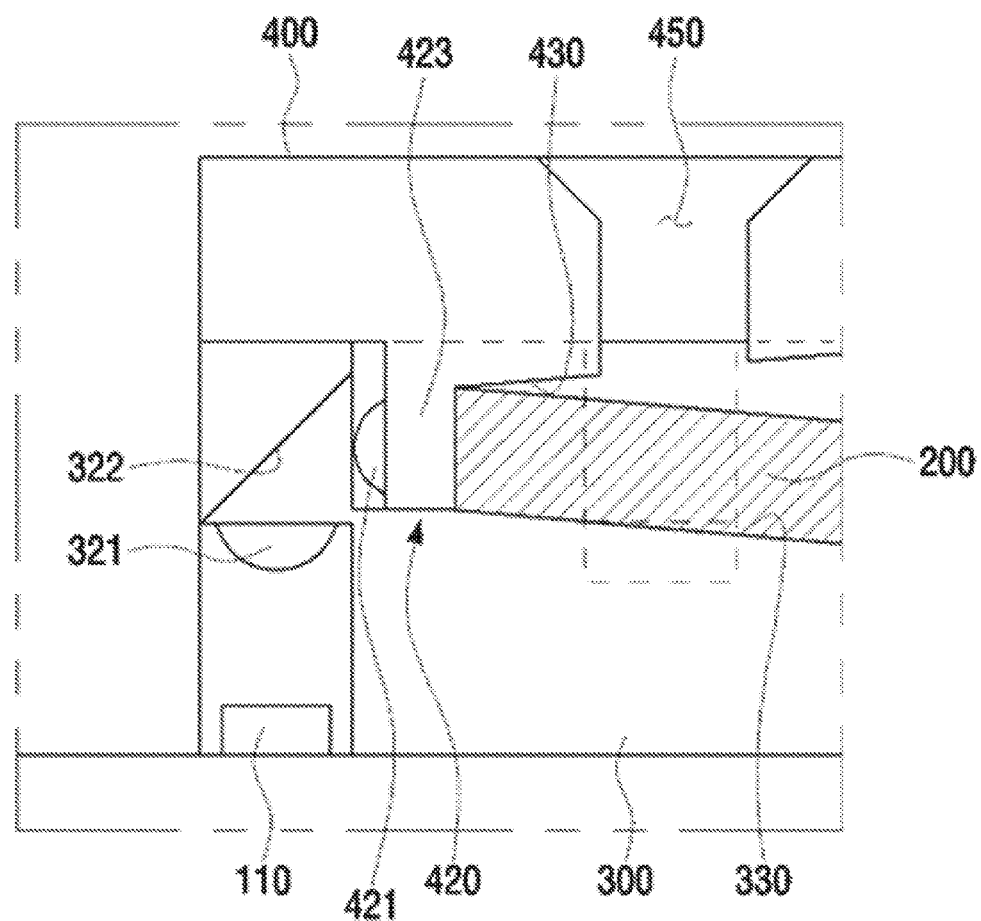
Figure 14:
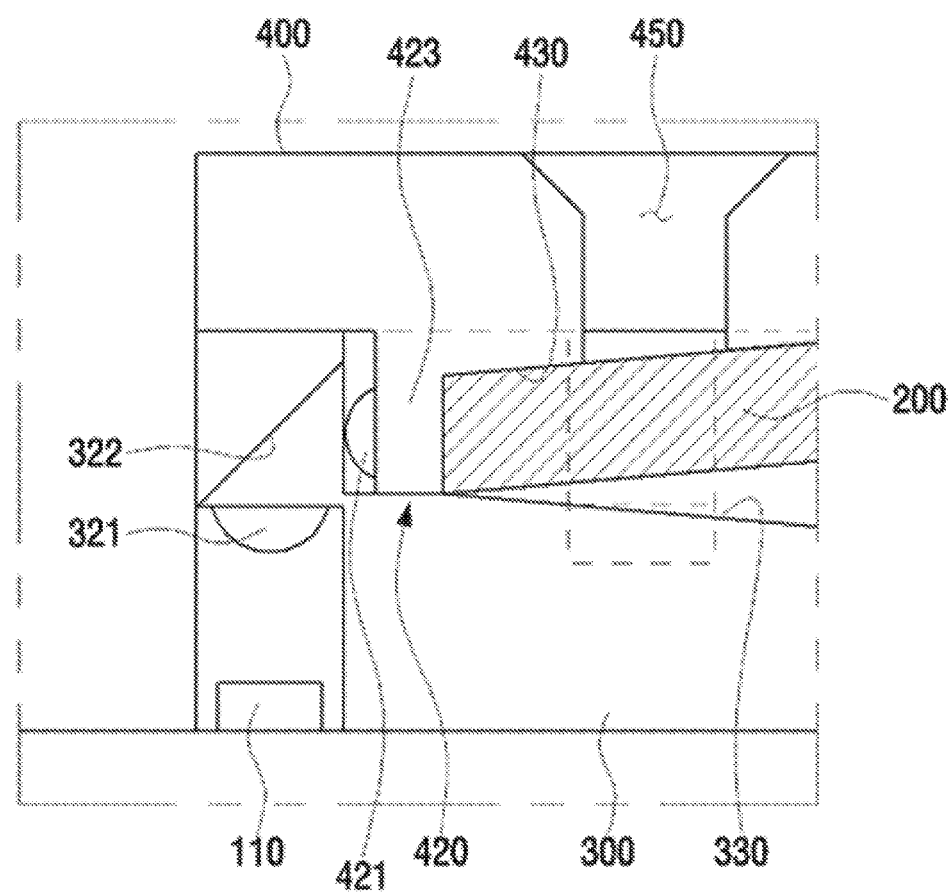

FIGS. 10 and 11 are top views illustrating the optical fibers 200 aligned on the optical bench 300 and in the cover 400, which are shown in FIG. 1. FIGS. 12 to 14 are side cross-sectional views illustrating the same.

As illustrated in FIGS. 10 and 11, the seating groove 330 and the hold part 430 may be horizontally tapered to become gradually widened from one end at which the ends of the optical fibers 200 are disposed toward the other end portion into which the optical fibers 200 are inserted. Consequently, depending on the horizontal inclinations of the cut surfaces of the optical fibers 200, directions of the optical fibers 200 may be horizontally adjusted to the left or the right to allow the cut surfaces to be in full contact with the lens bar 423 of the lens assembly 420. In addition, as illustrated in FIGS. 12 to 14, the space between the seating groove 330 and the bottom surface 433 of the hold part 430 may be vertically tapered to become gradually widened from the one end portion at which the ends of the optical fibers 200 are disposed toward the other end portion into which the optical fibers 200 are inserted. Consequently, depending on the vertical inclinations of the cut surfaces of the optical fibers 200, the directions of the optical fibers 200 may be vertically adjusted to allow the cut surfaces to be in full contact with the bar 423 of the lens assembly 420.

Figure 15:
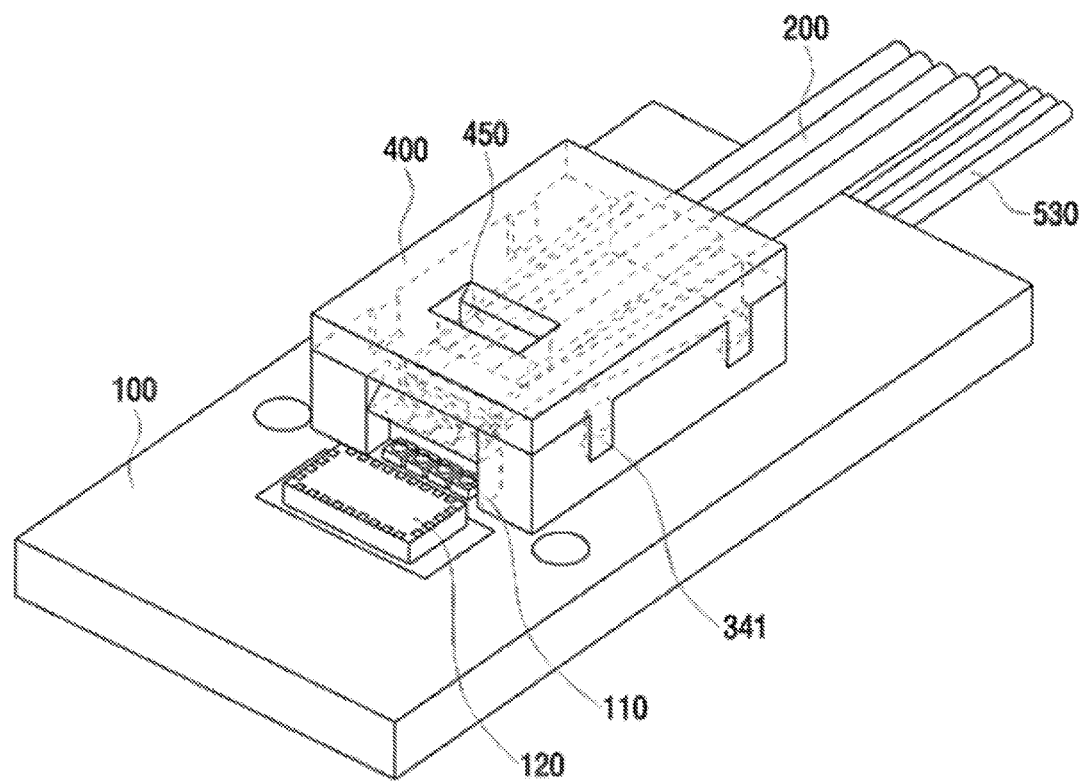
FIG. 15 is a perspective view of the optical module of FIG. 1.

FIG. 15 illustrates the optical bench 300 and the cover 400 coupled to the substrate 100 with the optical fibers 200 inserted therein. A method of manufacturing an optical module according to the principles of the present disclosure will be described with reference to FIG. 15. First, wiring may be printed on the substrate (or PCB) 100 at positions where the optical devices 110 and the IC device 120 are to be disposed. The reference marks 130 may also be printed together with the wiring at this point. The optical devices 110 and the IC device 120 may be coupled to the substrate and/or wiring by referring to the reference marks 130 using, for example, a pick-and-place equipment, or the like.

Next, the optical bench 300 may be disposed by referring to the reference marks 130 using, for example, the pickand-place equipment, or the like. The legs 350 of the optical bench 300 may be inserted into the leg insertion holes 140. To increase a fixing force, the legs 350 may be inserted into and coupled to the leg insertion holes 140 after the legs 350 are coated with an adhesive. Alignment of the optical bench 300 may performed by referring to the reference marks 130. Since the alignment is performed based on the reference marks 130, accuracy may be dramatically improved compared to an alignment process relying only on the coupling of leg insertion holes 140 and the legs 350. Therefore, an alignment error due to tolerance errors when the leg insertion holes 140 are formed in the substrate 100 may be reduced or eliminated. Next, the cover 400 may be coupled to the optical bench 300. The fastening ports 441 may be inserted into the fastening grooves 341, which may increase the fixing force. When a hook structure is employed for the fastening ports 441, as shown in FIG. 4, one-touch coupling may be possible.

Next, the optical fibers 200 may be inserted into the space between the seating grooves 330 and the hold part 430. In FIG. 4, the cut surfaces of the optical fibers 200 may be in contact and coupled to a surface of the lens bar 423 of the lens assembly 420 on which the second lens 421 is formed. Since the seating groove 330 and the hold part 430 may be vertically and horizontally formed in a tapered shape, the directions of the optical fibers 200 may be vertically and horizontally adjusted, for example, using a sensor, to an angle that may maximize the optical efficiency. The optical fibers 200 may be held at the angle that may maximize the optical efficiency. By forming the tapered shape, even when the cut surfaces of the optical fibers 200 are not perfectly perpendicular to the lengthwise direction thereof, the cut surfaces may be horizontally in full contact the lens bar 423 of the lens assembly 420. Accordingly, it may be possible to eliminate a polishing process for making the cut surfaces to be perpendicular to the lengthwise direction. This may also significantly increase the process yield and may make the optical module more suitable for mass production. Also, it may be possible to reduce or eliminate an optical loss that occurs due to the cut surfaces of the optical fibers 200 not horizontally touching the lens assembly 420.

Next, an adhesive is injected through the injection port 450 and hardened to fix the optical fibers 200. After adjusting the optical path of the optical fibers 200, the process of taking the optical fibers 200 out of the seating groove 300 and coating the optical fibers 200 with the adhesive may be omitted. This is conducive to simplification of a process and a reduction in manufacturing cost. Meanwhile, when the optical fibers 200 are a hybrid cable including a copper cable, the receptacle 510 to which the copper cable 530 can be coupled may be installed on a bottom surface of the substrate 100. The arrangement position of the receptacle 510 is not limited to the bottom surface of the substrate 100, but may be located elsewhere, such as, for example on the top surface of the substrate 100. The receptacle 510 for the copper cable 530 may be provided so that, when a hybrid cable is used, a process of soldering the copper cable 530 directly onto the substrate 100 can be omitted such that assembly time is reduced and manufacturing cost is reduced. As described above, glass optical fibers, plastic optical fibers, the hybrid cable, or the like, may be used as the optical fibers 200.

As described above, the present disclosure provides an optical module that may improve the optical coupling efficiency between the components. Also, the tolerance of an alignment process may be greatly improved so that the defect rate of products may be reduced, and optical alignment may be simplified so that a number of manufacturing step may be reduced. Furthermore, the thickness of the optical module may be reduced, the structure of the optical module may be simplified, and the manufacturing cost of the optical module may be reduced.

According to the present disclosure, an aspheric concave lens may be employed in concentrating transmitted light to prevent an optical distortion phenomenon, including, for example, optical crosstalk, return loss, airy disk, and the like, during high-speed transmission of light. Also, a triple lens system including a concave lens may be employed to achieve a larger alignment tolerance, which may make it possible to facilitate an assembly process of constituent components.

According to the present disclosure, a cut surface of an optical fiber may be vertically disposed on an optical path even when the cut surface of the optical fiber is not vertical. Hence, the step of polishing an end portion of the optical fiber may be eliminated, thereby simplifying the manufacturing process and reducing the manufacturing time and cost.

In addition, according to the present disclosure, when a cut surface of an optical fiber is not vertical, the optical fiber may be aligned at an angle and in a position that satisfy the required optical transmission efficiency without performing passive alignment, which is time consuming. Consequently, the manufacturing process may be simplified, the manufacturing time may be shortened, and the yield may be improved.

The terms "including," "comprising" and variations thereof, as used in this disclosure, mean "including, but not limited to," unless expressly specified otherwise.

The terms "a," "an," and "the," as used in this disclosure, means "one or more," unless expressly specified otherwise.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

While the disclosure has been described in terms of exemplary embodiments, those skilled in the art will recognize that the disclosure can be practiced with modifications in the spirit and scope of the appended claim, drawings and attachment. The examples provided herein are merely illustrative and are not meant to be an exhaustive list of all possible designs, embodiments, applications or modifications of the disclosure.

What is claimed is:

1. An optical module, comprising:
 a substrate;
 one or more optical devices disposed on the substrate;
 an integrated circuit (IC) device disposed on the substrate for driving the one or more optical devices;

one or more optical fibers in communication with the one or more optical devices, respectively;

an optical bench that attaches to the substrate and concentrates a light transmitted between the one or more optical devices and the one or more optical fibers, wherein the optical bench changes a direction of the concentrated light; and a cover that attaches to the optical bench with the one or more optical fibers fixed therebetween, wherein the optical bench comprises a first body, a seating groove that is formed on a top surface of the first body to receive the one or more optical fibers, and an optical unit that adjoins an end of the seating groove and faces ends of the one or more optical fibers, wherein the optical unit concentrates and changes the direction of the light transmitted between the one or more optical devices and the one or more optical fibers;

wherein the cover comprises a second body that is shaped to engage the first body of the optical bench, and a hold part that is formed at a bottom surface of the second body and shaped corresponding to the seating groove to hold the one or more optical fibers therebetween; and wherein a space between the seating groove and the hold part are tapered to become gradually widened from one end thereof adjoining the optical unit toward the other end portion.

2. The optical module of claim 1, wherein the first body and second body are block-shaped.

3. The optical module of claim 1, wherein the cover further comprises an injection port extending through the second body to the hold part.

4. The optical module of claim 1, further comprising one or more reference marks formed on the substrate.

5. An optical module, comprising:

a substrate;

one or more optical devices disposed on the substrate;

an integrated circuit (IC) device disposed on the substrate for driving the one or more optical devices;

one or more optical fibers in communication with the one or more optical devices, respectively;

an optical bench that attaches to the substrate and concentrates a direction of a light transmitted between the one or more optical devices and the one or more optical fibers, wherein the optical bench changes a direction of the concentrated light; and a cover that attaches to the optical bench with the one or more optical fibers fixed therebetween, wherein the optical bench comprises a first body, a seating groove that is formed on a top surface of the first body to receive the one or more optical fibers, and an optical unit that adjoins an end of the seating groove and faces ends of the one or more optical fibers, wherein the optical unit concentrates and changes the direction of the light transmitted between the one or more optical devices and the one or more optical fibers;

wherein the optical unit comprises one or more first lenses facing the one or more optical devices, and a reflector unit that is disposed on the one or more first lenses to deflect the light transmitted between the one or more optical devices and the one or more optical fibers;

wherein the cover further comprises a lens assembly that comprises one or more lenses provided corresponding to the one or more optical fibers, respectively; and wherein the lens assembly concentrates the light transmitted between the optical unit and the one or more optical fibers.

6. The optical module of claim 5, wherein the reflector unit comprises a prism, and the one or more first lenses are disposed proximate to the prism.

7. The optical module of claim 5, wherein the reflector unit comprises a reflectance surface that has an inclination of about 45° and adjoins the seating groove.

8. The optical module of claim 5, wherein the lens assembly comprises:

a lens bar that protrudes from the bottom surface of a second body of the cover and is perpendicular to a lengthwise direction of the one or more optical fibers; and one or more second lenses disposed at a first surface of the lens bar facing the reflector unit.

9. The optical module of claim 8, wherein the lens assembly further comprises one or more third lenses disposed at a second surface of the lens bar facing the one or more optical fibers.

10. The optical module of claim 9, wherein the one or more second lenses comprise a convex lens.

11. The optical module of claim 10, wherein the one or more second lens comprise an aspheric convex lens, and the one or more third lenses comprise an aspheric concave lens.

12. The optical module of claim 9, wherein the one or more second lenses comprise an aspheric concave lens, and the one or more third lenses comprise an aspheric convex lens.

13. The optical module of claim 5, wherein the cover further comprises a step jaw that protrudes from a bottom surface of a second body of the cover between the lens assembly and an injection port, and wherein the step jaw limits movements of the ends of the one or more optical fibers.

14. An optical module, comprising:

a substrate;

one or more optical devices disposed on the substrate;

an integrated circuit (IC) device disposed on the substrate for driving the one or more optical devices;

one or more optical fibers in communication with the one or more optical devices, respectively;

an optical bench that attaches to the substrate and comprises a seating groove that is formed on a top surface of the optical bench to receive the one or more optical fibers; and a cover that attaches to the optical bench to hold the one or more optical fibers therebetween, the cover comprising a hold part that is formed at a bottom surface of the cover, wherein a space between the seating groove and the hold part is tapered to become gradually widened from a first end of the space toward a second end of the space.

15. The optical module of claim 14, wherein the cover comprises a body that is shaped to engage a body of the optical bench, and wherein the hold part is shaped corresponding to the seating groove in the optical bench to hold the one or more optical fibers therebetween.

16. The optical module of claim 15, wherein the cover further comprises:
- an injection port extending through the body of the cover to the hold part;
- a lens assembly that adjoins ends of the one or more optical fibers; and
- a step jaw that protrudes from the bottom surface of the body of the cover between the lens assembly and the injection port,
- wherein the step jaw limits movements of the ends of the one or more optical fibers.

17. The optical module of claim 14, wherein the optical bench further comprises an optical unit that adjoins an end of the seating groove and faces ends of the one or more optical fibers.

18. The optical module of claim 17, wherein the first end of the space adjoins the optical unit.

19. The optical module of claim 14, wherein the cover further comprises at least one of an injection port extending to the hold part, a step jaw that protrudes from a bottom surface of the cover, and a lens assembly that comprises one or more lenses provided corresponding to the one or more optical fibers, respectively.

20. The optical module of claim 14, wherein the cover further comprises a step jaw that protrudes from a bottom surface of the cover and limit movement of the one or more optical fibers.

* * * * *